March 19, 1929. G. T. BERRY 1,705,553
WELL MEASURING DEVICE
Filed April 13, 1928 2 Sheets-Sheet 1
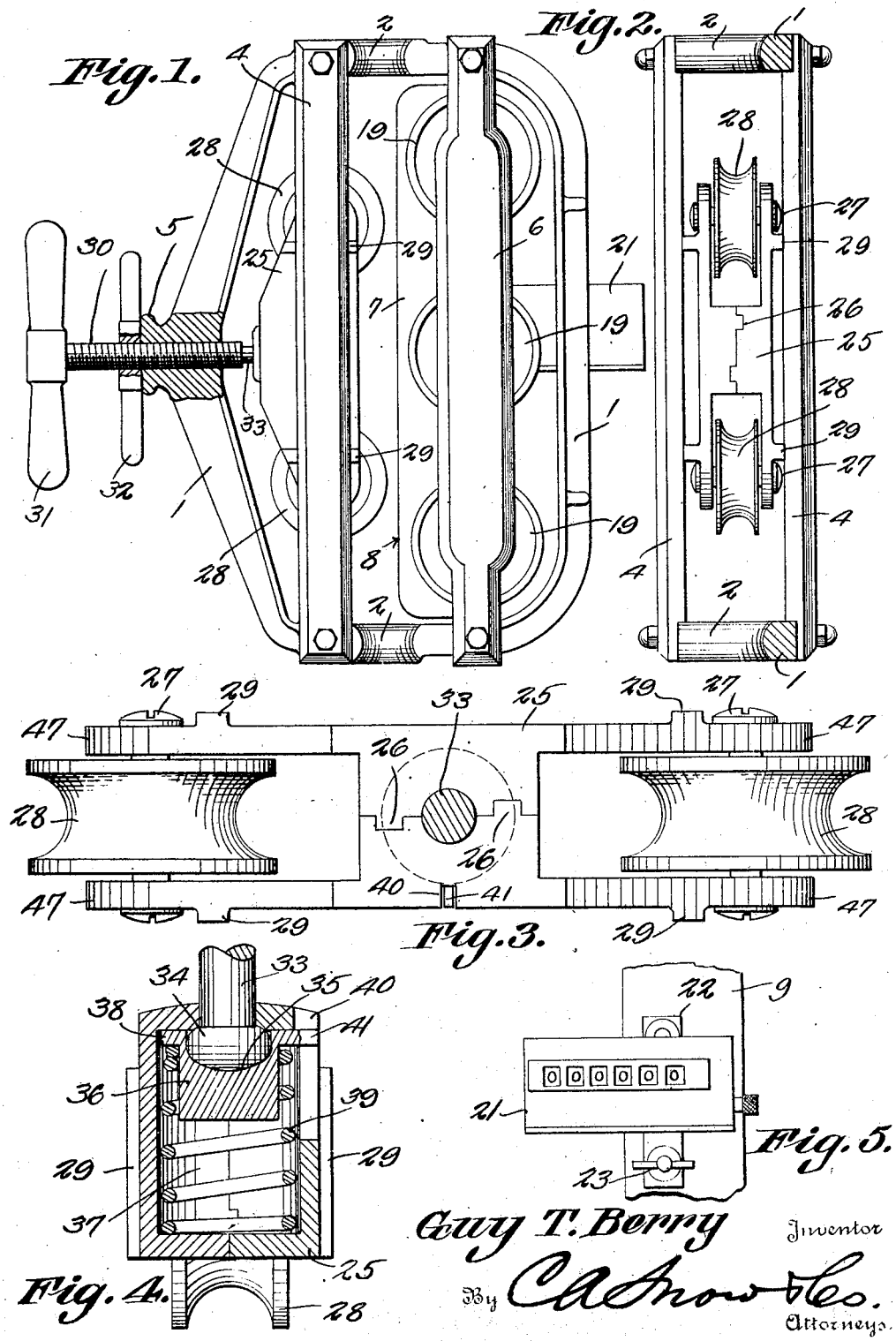

March 19, 1929.                G. T. BERRY                1,705,553
                            WELL MEASURING DEVICE
                           Filed April 13, 1928         2 Sheets-Sheet 2
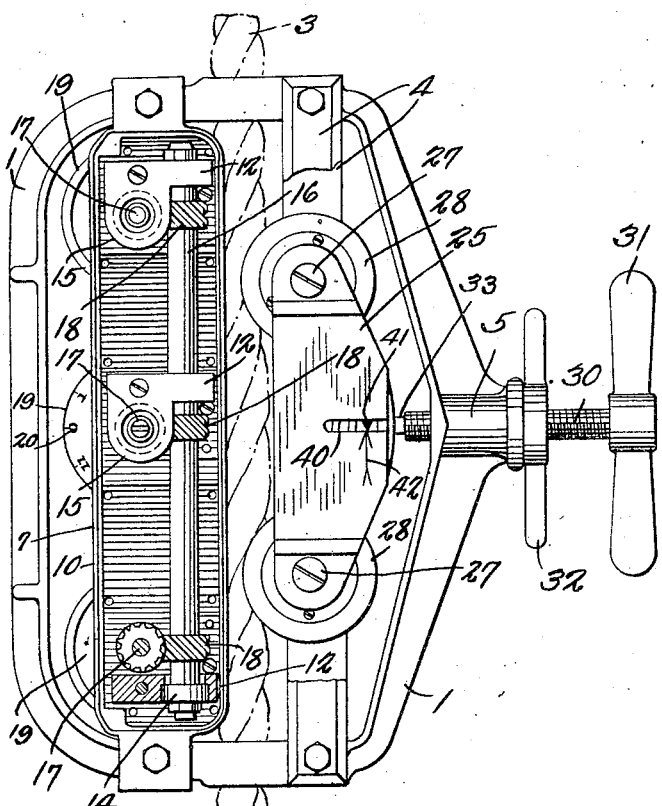
Fig. 6.
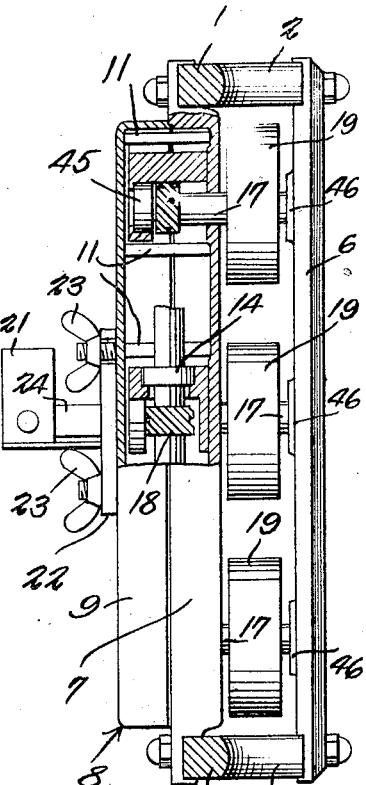
Fig. 7.
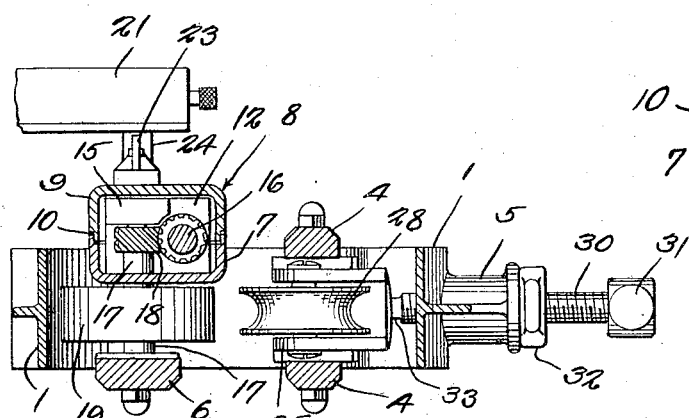
Fig. 8.
Fig. 9.
Guy T. Berry
Inventor
By C. A. Snow & Co.
Attorneys.

Patented Mar. 19, 1929.

1,705,553

UNITED STATES PATENT OFFICE.

GUY T. BERRY, OF INDEPENDENCE, KANSAS.

WELL-MEASURING DEVICE.

Application filed April 13, 1928. Serial No. 269,787.

The device forming the subject matter of this application is adapted to be used for measuring the depth of a well, and one object of the invention is to provide a positive drive for the meter or counter, to the end that extreme accuracy in measurement may be obtained. A further object of the invention is so to house in certain of the moving parts, that the same will not be subject to deterioration, due to contact with salt water or other corrosive substances found in a well. A further object of the invention is to provide a novel means whereby an exact control of the spring pressure exerted on the pulleys may be secured.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in side elevation, a device constructed in accordance with the invention, parts being broken away;

Figure 2 is a longitudinal section on the machine, parts being omitted;

Figure 3 is an elevation of the head which is carried on the end of the adjusting screw;

Figure 4 is a sectional view showing the means whereby the foot is held on the end of the screw, together with the spring and its adjusting means;

Figure 5 is a fragmental elevation showing the meter or counter;

Figure 6 is an elevation wherein the lid of the lubricant receptacle has been removed;

Figure 7 is a longitudinal section wherein parts are broken away;

Figure 8 is a transverse section;

Figure 9 is a fragmental sectional view illustrating the means whereby the constituent parts of the lubricant receptacle are held together.

The device forming the subject matter of this application preferably is made, so far as possible, out of material which will not deteriorate when subjected to the corrosive agencies often found in wells, and the machine embodies a frame which may be variously constructed. As shown in the drawings, the frame comprises a loop-shaped member 1 having notches in its ends, the notches being marked by the numeral 2, and opening laterally out of the frame, so that the cable 3 which extends down into the well, may be received readily in the notches. Oppositely disposed guide bars 4 are secured at their ends to the loop-shaped member 1 and form parts of the frame. At one side, the loop-shaped member 1 has a projection 5, which is shown best in Figure 8. A bearing bar 6 extends lengthwise of the member 1 and is secured at its ends thereto.

The device embodies a receptacle 8 for a lubricant. The receptacle 8 comprises a hollow base 7 which is disposed opposite to the bearing bar 6, the ends of the base 7 being secured to the member 1 of the frame. The lubricant receptacle 8 embodies a lid 9 mounted on the base 7, the lid and the base being halved together, as shown at 10, so as to secure a tight joint and prevent grease from leaking out of the receptacle 8. The lid 9 is held on the base 7 by screws 11.

Within the receptacle 8 are transverse brackets 12, and in the brackets, antifriction bearings 14, such as ball bearings are mounted. It is not necessary to detail the antifriction bearings in the drawings, and, therefore, they are shown more or less diagrammatically. Each of the brackets 12 has a wing 15 which extends longitudinally of the receptacle 8, the brackets 12 being mounted on the base 7 of the lubricant receptacle. There are ball bearings 45 in the wings 15. A main shaft 16 is located within the lubricant receptacle 8 and extends longitudinally thereof. The main shaft 16 is journaled for rotation in the ball bearings 14 of the transverse brackets 12, and is held against longitudinal movement therein. Auxiliary shafts 17 are disposed at right angles to the main shaft 16 and are journaled on the ball bearings 45 of the wings 15. The auxiliary shafts 17 extend out of the lubricant receptacle 8, through the base 7 thereof, as will be understood readily when Figure 7 of the drawings is examined. The outer ends of the shafts 17 are journaled in ball bearings 46 mounted in the bar 6 and indicated diagrammatically in Figure 7 of the drawings. The shafts 17 are connected operatively to the main shaft 16 by means of intermeshing spiral gears 18 located within the lubricant receptacle 8. Wheels 19 are secured to the auxiliary shafts 17 and are located between the bearing bar 6 and the base 7 of the lubricant receptacle 8. The intermediate one of the wheels 19 may carry a scale 20, shown in Figure 6 of the drawings, and this scale may be arranged as found expedient.

The numeral 21 designates a meter or counter of any desired construction carried by a bracket 22 which is held by stud bolts and wing nuts 23, or in any other desired way, on the lid 9 of the lubricant receptacle 8. The shaft 24 of the meter or counter 21 is operatively connected with the intermediate auxiliary shaft 17, there being three of the shafts 17, as shown in Figure 6.

The device comprises a two-part foot 25 which is shown in detail in Figure 3. The parts of the foot 25 are laterally separable but they are held together by securing devices 27 which also form shafts whereon grooved pulleys 28 are journaled, the pulleys being located in forks 47 at the ends of the foot 25. The parts of the foot 25 are tongue and grooved together as shown at 26, so that there will be no relative movement between the parts of the foot. The foot 25 is disposed between the guide bars 4 and the foot is provided with transverse ribs 29 adapted to contact with the guide bars, as indicated in Figures 2 and 1 of the drawings. The grooved pulleys 28 are disposed opposite to the spaces between the wheels 19.

The foot 25 is carried by an adjusting device, such as a screw 30, the screw being threaded for adjustment into the projection 5 of the member 1 of the main frame. At its outer end, the screw 30 is supplied with a turning head 31, whereby the screw may be advanced and retracted. A lock nut 32 is threaded on the screw 30 and is adapted to cooperate with a projection 5, to hold the screw 30 in any position to which it may have been adjusted.

At the inner end, the screw 30 is supplied with a stem 33 having an enlargement or ball 34. The foot 35 is mounted on the stem 33, as shown in Figure 4 of the drawings, the construction being such that the stem cannot turn in the foot when the screw 30 is rotated. The enlargement 34 on the inner end of the stem 33 is received for rotation in a socket 35 formed in an abutment 36 located in a chamber 37 which is formed in the foot 25. The abutment 36 is provided at one end with a flange 38. A compression spring 39 is located in the chamber 37. One end of the compression spring 39 surrounds the abutment 36 and engages the flange 38. The opposite end of the compression spring 39 engages the foot 25 within the chamber 37, as Figure 4 will show. There is a slot 40 in the side of the foot 25, and in this slot there operates an indicator 41 which is formed on the flange 38 of the abutment 36. The indicator 41 is adapted to cooperate with a marking 42 on the outer surface of the foot 25, the marking being shown best in Figure 6 of the drawings. The marking 42 may be of any desired kind.

The frame of the machine may be supported in any desired manner, the cable 3 being located between the wheels 19, on the one hand, and the grooved pulleys 28, on the other hand, the cable being located in the notches 2 which are located at the upper and lower ends of the frame. When the cable 3 runs downwardly into the well, the wheels 19 will be rotated, and rotation will be imparted to the shafts 17. Owing to the fact that the shafts 17 are operatively connected together by means of the intermeshing spiral gears 18 and the main shaft 16, extreme accuracy of measurement is obtained, the cable 3 being at all times in contact with the wheels 19 which are coupled together, as aforesaid. The intermediate shaft 17 cooperates with the shaft 24 of the meter or counter 21 and operates that instrumentality, it being possible to get a reading in feet or other coarse units, from the meter, a finer reading being taken off the scale 20 on the intermediate wheel 19, reference being had to Figure 6 of the drawings at this point.

It is to be observed that the shaft 16, together with the means whereby that shaft is coupled to the shafts 17, are located within the receptacle 8. The receptacle 8 is filled with grease, and not only are the operating parts well lubricated, but, as well, they are housed in and protected from salt water and other elements found in an oil well likely to produce rust and degeneration of meter parts.

The screw 30 may be advanced, and after it has been advanced to the required place, it may be held in its adjusted position by threading the lock nut 32 against the end of the projection 5. When the screw 30 moves inwardly, the stem 33 and the enlargement 34 of Figure 4 moves inwardly, the abutment 36 being carried inwardly, and the spring 39 being compressed. The indicator 41 on the abutment 36 is carried inwardly, and it will be seen from Figure 6 that the position of the indicator 41 with respect to the marking 42 may be noted. The operator, in this way, has an exact control of the compressive effort of the spring 39 and, consequently, an exact control of the pressure wherewith the grooved pulleys 28 bear against the cable 3 to thrust the cable against the wheels 19. In order to obtain accurate readings as to the depth of the well, it is important that the pressure exerted on the spirally laid cable 3 be known, and the mechanism delineated in Figures 4 and 6 of the drawings accomplishes this.

One of the advantages of the present invention is that it may be adjusted and regulated, so as to get an accurate reading with any individual meter or counter 21. After the particular meter is mounted in place, the screw 30 may be advanced to put the proper pressure on the spring 39 and on the wheels 28, and the cable 3 can be run back and forth, adjustments being made until the error is worked down so small that it does not amount to anything in the practical operation of measuring the depth of the well. Then, the mark 42 may be placed on the foot 25, opposite to the indicator 41. Thereafter, the operator need do no more than to adjust the screw 30 lengthwise until the indicator 41 is opposite to the mark 42, and he can be assured that the machine is operating with respect to the individual meter 21, in such a way that the error is negligible.

This application is not intended and shall not be construed as an attempt to duplicate or infringe upon Patents Nos. 1,408,113, 1,439,742, and 1,484,036 heretofore issued respectively to Richard C. Mason, but applies to improvements thereon, by which the original devices are made more accurate and efficient.

Having thus described the invention, what is claimed is:—

1. In a device of the class described, a frame, a lubricant receptacle on the frame, a plurality of wheels, means for supporting the wheels for rotation on the frame, a positive driving connection between the wheels and located within the receptacle, a meter operatively connected with one of the wheels, and mechanism for holding a cable in contact with the wheels, to rotate the wheels.

2. In a device of the class described, a frame, a lubricant receptacle on the frame, auxiliary shafts supported for rotation and extended into the receptacle, wheels on the auxiliary shafts, a main shaft journaled for rotation within the receptacle, intermeshing gears connecting the main shaft with the auxiliary shafts and located within the receptacle, a meter operatively connected with one of the auxiliary shafts, and mechanism for holding a cable in contact with the wheels, to rotate the wheels.

3. In a device of the class described, a frame, a lubricant receptacle on the frame, a plurality of wheels, means for supporting the wheels for rotation on the frame, a positive driving connection between the wheels and located within the receptacle, a meter operatively connected with one of the wheels, a foot constituting means for holding a cable in contact with the wheels, whereby the cable will rotate the wheels, spring means for moving the foot toward the wheels and an adjusting device operatively connected with the spring means.

4. In a device of the class described, a frame, a lubricant receptacle on the frame, a plurality of wheels, means for supporting the wheels for rotation on the frame, a positive driving connection between the wheels and located within the receptacle, a meter operatively connected with one of the wheels, a foot constituting means for holding a cable in contact with the wheels, whereby the cable will rotate the wheels, spring means for moving the foot toward the wheels, an adjusting device operatively connected with the spring means, and indicating mechanism connected to the spring means to show the amount that the spring means has been affected by the adjusting device.

5. In a device of the class described, a frame, an adjusting device movable in the frame, a foot controlled by the adjusting device, cooperating rotary members journaled respectively on the foot and on the frame, a meter operatively connected with one of the rotary members, the adjusting device constituting means for moving the foot to vary the pressure with which the rotary members cooperate, and mechanism for indicating said pressure, the indicating mechanism being calibrated with respect to the individual meter.

In testimony that I claim the foregoing as my own, I have hereto affixed my signature.

GUY T. BERRY.